US008844129B2

(12) United States Patent
Velez

(10) Patent No.: US 8,844,129 B2
(45) Date of Patent: Sep. 30, 2014

(54) METHOD AND APPARATUS FOR HOLE CRACK REMOVAL

(75) Inventor: Ramon M. Velez, Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 2182 days.

(21) Appl. No.: 11/872,170

(22) Filed: Oct. 15, 2007

(65) Prior Publication Data

US 2009/0094828 A1 Apr. 16, 2009

(51) Int. Cl.

| | |
|---|---|
| ***B23P 6/00*** | (2006.01) |
| ***F01D 5/00*** | (2006.01) |
| ***F01D 25/28*** | (2006.01) |

(52) U.S. Cl.

CPC ............ *F01D 5/005* (2013.01); *F05D 2230/80* (2013.01); *F01D 25/285* (2013.01)

USPC ............ 29/888.021

(58) Field of Classification Search

USPC ............ 29/888.021, 35; 269/71, 74

See application file for complete search history.

(56) References Cited

U.S. PATENT DOCUMENTS

| | | | | |
|---|---|---|---|---|
| 4,545,106 | A * | 10/1985 | Juengel | 29/563 |
| 4,564,179 | A * | 1/1986 | Hollingsworth | 269/71 |
| 4,601,110 | A | 7/1986 | Donaldson | |
| 4,726,104 | A | 2/1988 | Foster | |
| 5,111,046 | A | 5/1992 | Bantel | |
| 5,243,759 | A | 9/1993 | Brown | |
| 5,382,135 | A | 1/1995 | Green | |
| 5,544,873 | A | 8/1996 | Vickers | |
| 5,867,885 | A | 2/1999 | Bales | |
| 6,210,111 | B1 | 4/2001 | Liang | |
| 6,820,468 | B2 | 11/2004 | Powers | |
| 6,824,359 | B2 | 11/2004 | Chlus | |

* cited by examiner

*Primary Examiner* — Alexander P Taousakis

*Assistant Examiner* — Moshe Wilensky

(74) *Attorney, Agent, or Firm* — Carlson, Gaskey & Olds, PC

(57) ABSTRACT

A method and apparatus for removing cracks on a gas turbine engine component includes mounting a first pivotable tool to a base, mounting a second pivotable tool to the first pivotable tool, and mounting a fixture holding the gas turbine engine component to the second pivotable tool. The first pivotable tool and the second pivotable tool are adjusted to position the gas turbine engine component in a desired orientation. A linear tool is then moved along an axis to machine at least one crack from a surface of the gas turbine engine component.

3 Claims, 3 Drawing Sheets

METHOD AND APPARATUS FOR HOLE CRACK REMOVAL

BACKGROUND OF THE INVENTION

This disclosure relates to a tooling fixture that is used to position a component to remove cracks from a component surface.

A gas turbine engine includes a turbine section with turbine blades. A turbine blade includes a platform, an airfoil extending outwardly from the platform in one direction, and root extending outwardly from the platform in an opposite direction. The turbine blade also includes a plurality of cooling holes. These holes can be formed in the airfoil, the root, and/or the platform.

The cooling holes are orientated to extend at different angles relative to each other, and each cooling hole includes a hole surface that can have cracks. A blending tool is used to machine the hole surfaces to remove the cracks. In one known method, the turbine blade is held in a fixture that is mounted to a base. The base includes flanges that support a pivot pin. The fixture is mounted to the flanges such that the fixture can pivot on the pivot pin. Due to the differing angular orientations of the cooling holes, it is difficult to position all of the cooling holes such that the blending tool can remove cooling hole cracks. This is especially difficult for cooling holes that are positioned underneath the platform, i.e. at or near the root. Thus, some of the cooling holes can be properly positioned, while others cannot.

For these difficult to reach cooling holes, an operator will remove the turbine blade from the fixture and hold the turbine blade in their hands. The operator then manually operates the blending tool to remove the cracks. This is time consuming and could potentially cause injury to the operator, as the operator is holding the turbine blade and blending tool in their hands.

Accordingly, there is a need to provide a fixture assembly and machining method that can efficiently remove cracks from a component.

SUMMARY OF THE INVENTION

An example fixture assembly for an engine component includes a base, a first pivotable tool mounted to the base, a second pivotable tool mounted to the first pivotable tool, and a fixture mounted to the second pivotable tool. The fixture includes a holding interface to hold at least one gas turbine engine component. A linear tool is movable along a linear axis to machine a surface on the at least one gas turbine engine component.

In one example, the fixture assembly is used to hold a gas turbine engine component, such as a turbine blade. The base comprises a horizontal base, and the first pivotable tool comprises a first socket wrench that has a first end mounted to the horizontal base and a second end that defines a first pivot axis. The second pivotable tool comprises a second socket wrench that has a first end mounted to the second end of the first socket wrench such that the second socket wrench is pivotable about the first pivot axis. The second socket wrench also includes a second end that defines a second pivot axis. The fixture that holds the turbine blade is mounted to the second end of the second socket wrench such that the fixture and the turbine blade are pivotable as a unit about the second pivot axis. The linear tool comprises a blending tool that is supported for vertical movement along a vertical axis relative to the horizontal base. The blending tool machines a surface on the turbine blade.

In one example, the blending tool machines cooling hole surfaces in the turbine blade. An example method for removing cracks in the cooling holes includes mounting the first pivotable tool to the base, mounting the second pivotable tool to the first pivotable tool, mounting the fixture holding the turbine blade to the second pivotable tool, and moving the linear tool along a linear axis to machine the cooling hole surface.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
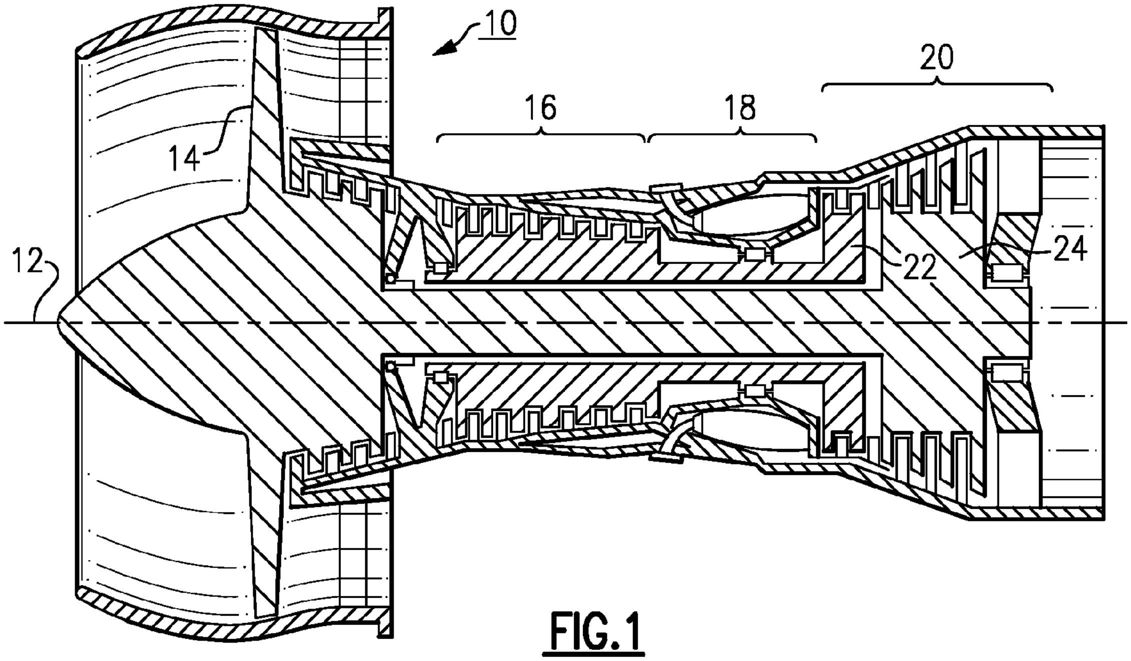
FIG. 1 is a highly schematic view of a cross-section of a gas turbine engine.

FIG. 1 illustrates selected portions of an example gas turbine engine 10, such as a turbofan gas turbine engine used for propulsion. In this example, the gas turbine engine 10 is circumferentially disposed about an engine centerline 12. The gas turbine engine 10 includes a fan 14, a compressor section 16, a combustion section 18, and a turbine section 20. The combustion section 18 and the turbine section 20 include corresponding blades 22 and vanes 24. As is known, air compressed in the compressor section 16 is mixed with fuel and burned in the combustion section 18 to produce hot gasses that are expanded in the turbine section 20. FIG. 1 is a somewhat schematic presentation for illustrative purposes only and is not a limitation on the disclosed examples. Additionally, there are various types of gas turbine engines, many of which could benefit from the examples disclosed herein and are not limited to the designs shown.

Figure 2:
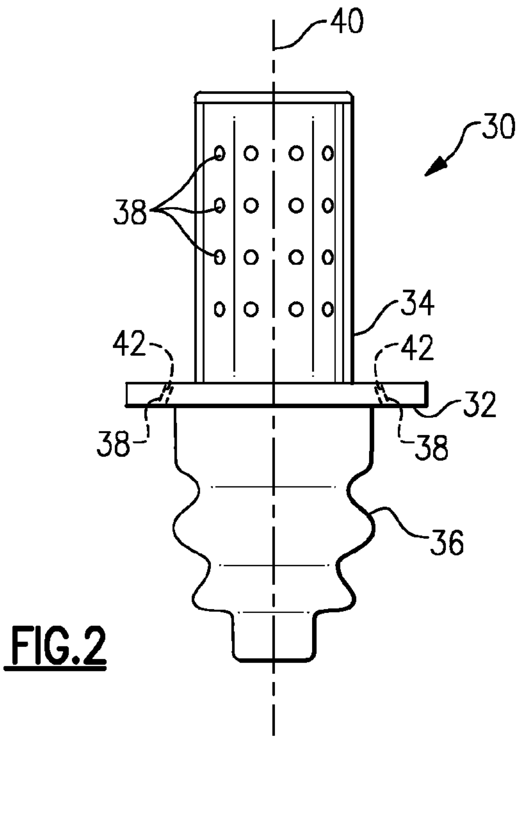
FIG. 2 is a highly schematic view of a turbine blade including a plurality of cooling holes.

FIG. 2 shows a highly schematic view of a turbine blade 30. The turbine blade 30 includes a platform 32, an airfoil 34, and a root 36. Cooling holes 38 are located in at least one of the airfoil 34, platform 32, and root 36. The turbine blade 30 defines a centerline 40 that extends along a length of the turbine blade 30. At least some of the cooling holes 38 are orientated at different angles relative to the centerline 40. Each of the cooling holes 38 includes a hole surface 42 that can have cracks. These cracks are removed via a machining process.

In order to remove the cracks, the cooling holes 38 have to be orientated such that a machining tool can access the hole surfaces 42. Due to the varying angular orientation of the cooling holes 38 it is difficult to properly position each of the cooling holes 38 for machining. It is especially difficult to provide proper access to cooling holes 38 that are located underneath the platform 32.

Figure 4:
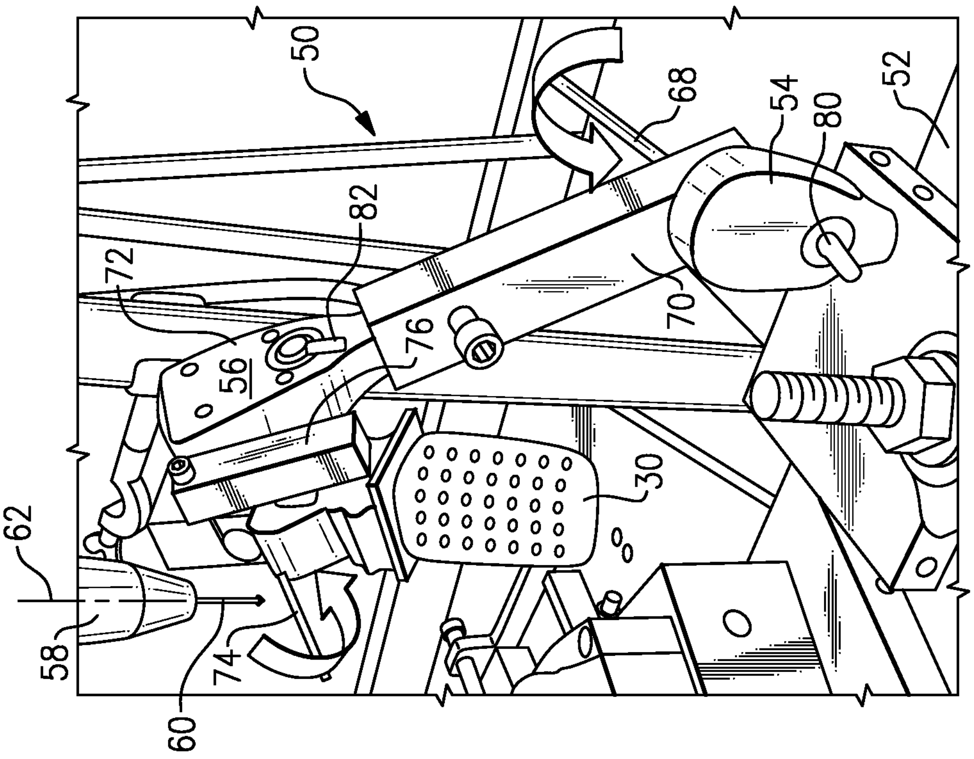
FIG. 4 is an enlarged view of the fixture assembly of FIG. 3.
Figure 3:
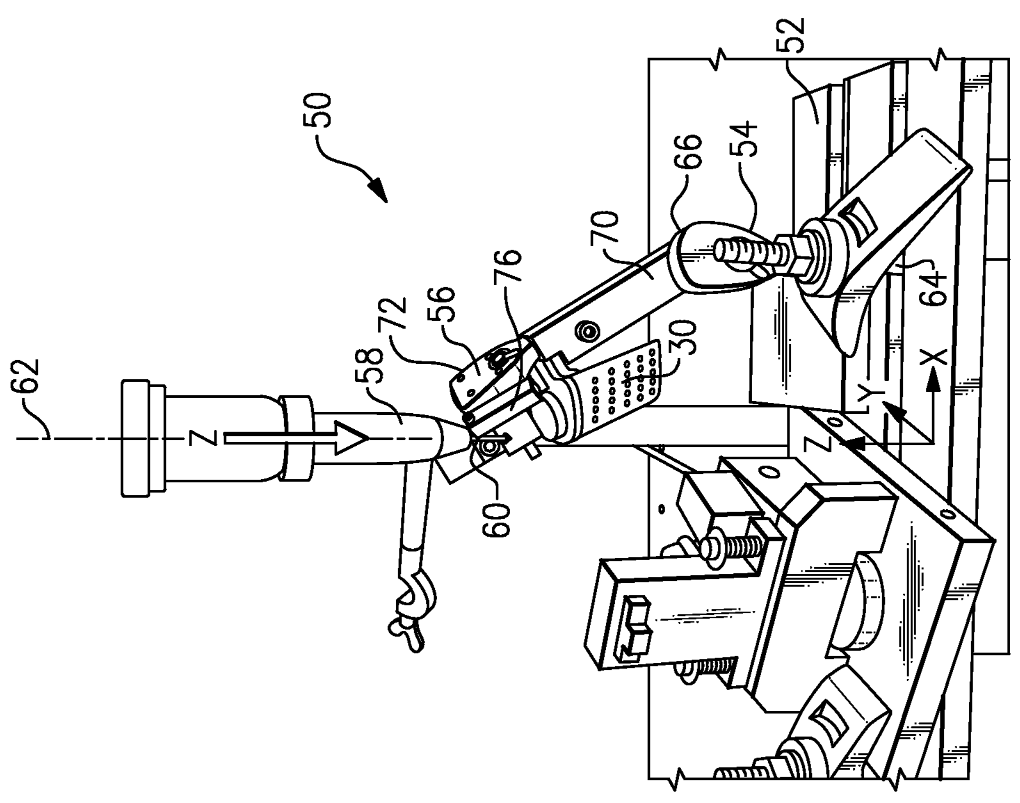
FIG. 3 is shows one example of a fixture assembly that holds a component.
Figure 5:
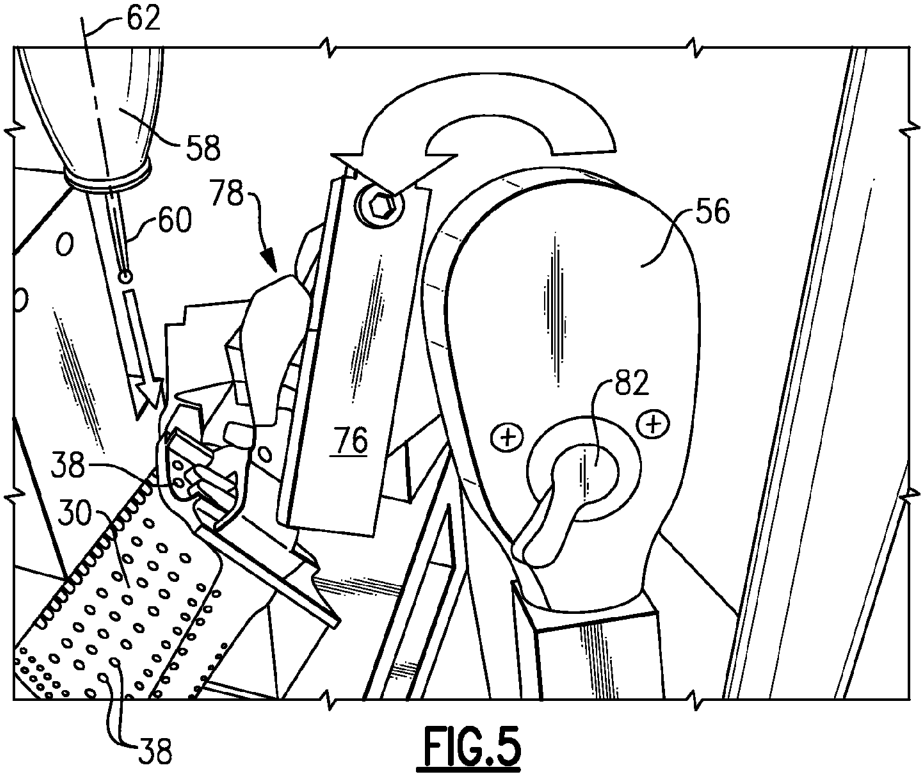
FIG. 5 is an enlarged view of a portion of the fixture assembly of FIG. 3.

A fixture assembly 50 is shown in FIGS. 3-5. The fixture assembly 50 includes a base 52, a first pivotable tool 54 mounted to the base 52, and a second pivotal tool 56 that is mounted to the first pivotable tool 54. A linear tool 58 is mounted for vertical movement relative to the base 52 and is used to machine surfaces of the cooling holes 38. As shown in FIG. 3, the base 52 comprises a horizontal platform that defines an x-y plane. In the example shown, the first pivotable tool 54 comprises a first socket wrench that is mounted to the base 52, and the second pivotable tool 56 comprises a second socket wrench that is mounted to the first pivotable tool 54; however, other pivoting tools could also be used. The linear tool 58 comprises a blending tool that is held fixed in a horizontal direction relative to the base 52. The linear tool 58 includes a rotating tool head 60 that is moved along a vertical axis 62 relative to the base 52. In the example shown, the tool head 60 moves along a z-direction relative to the x-y plane. In other words, the vertical axis 62 is perpendicular to a plane defined by the base 52.

The first pivotable tool 54 includes a first end 64 that is fixed to the base 52 and a second end 66 that defines a first pivot axis 68, see FIG. 4. A first end 70 of the second pivotable tool 56 is mounted to the second end 66 of the first pivotable tool 54 such that the second pivotable tool 56 is pivotable about the first pivot axis 68. The second pivotable tool 56 includes a second end 72 that defines a second pivot axis 74 that is different than the first pivot axis 68. In the example shown, the first pivot axis 68 extends generally in a y-direction along the x-y plane. The second pivotable tool 56 is positioned to face a different direction than the first pivotable tool 54. When the first 54 and second 56 pivotable tools are vertically aligned with each other along a common axis, the second pivotable tool 56 would face an x-direction of the x-y plane.

A fixture 76 includes a holding interface 78 (FIG. 5) that holds the turbine blade 30. The fixture 76 is mounted to the second end 72 of the second pivotable tool 56, such that the fixture 76 and turbine blade 30 are pivotable about the second pivot axis 74 as a unit. Thus, due to the use of two pivotable tools 54, 56, the fixture 76 and turbine blade 30 can be pivoted about multiple axes such that the cooling holes 38 can be properly positioned for access by the linear tool 58.

The first pivotable tool 54 includes a first locking mechanism 80 (FIG. 4) to lock the first end 70 of the second pivotable tool 56 in a desired orientation. The second pivotable tool 56 includes a second locking mechanism 82 (FIG. 5) that locks the fixture 76 in a desired orientation. In the example shown, the first 80 and second 82 locking mechanisms are reverse ratchet mechanisms, however other locking mechanisms could also be used. The operation of reverse ratchet mechanisms is known.

The first 54 and second 56 pivotable tools are pivotable about the first 68 and said second 74 pivot axes to orientate each of the plurality of cooling holes 38 in a generally vertical direction relative to the base 52. This allows the linear tool 58 to move along the vertical axis 62 to machine surface cracks of the cooling holes 38.

An example method for removing these cracks includes mounting the first pivotable tool 54 to the base 52, mounting the second pivotable tool 56 to the first pivotable tool 54, mounting the fixture 76 holding the turbine blade 30 to the second pivotable tool 56, and moving the linear tool 58 along the vertical axis 62 to remove a crack from one of the cooling holes 38.

For example, the fixture 76 is pivoted about the first 68 and second 74 axes to a first position such that one of the plurality of cooling holes 38 is aligned with the vertical axis 62. The linear tool 58 then moves downwardly along the vertical axis 62 to remove any cracks in the cooling hole 38. Then, the fixture 76 is subsequently pivoted about the first 68 and second 74 axes as needed to a second position such that another one of the plurality of cooling holes 38 is aligned with the vertical axis 62. The linear tool 58 is then moved along the vertical axis 62 to remove any cracks. This process is repeated with each of the cooling holes 38 as needed until all of the hole cracks have been removed.

Due to the multiple degrees of freedom of movement provided by the combination of the fixture 76, base 52, and the first 54 and second 56 pivotable tools, each of the cooling holes can be positioned in alignment with the vertical axis 62 of the linear tool 58. As such, an operator can remove all of the hole cracks without having to remove the turbine blade 30 from the fixture 76. Also, while the fixture assembly 50 is shown holding turbine blade 30, the fixture assembly 50 could also be used for other engine components. Further, the fixture assembly 50 could be used for cooling holes 38 located at any location in the turbine blade 30.

Figure 6:
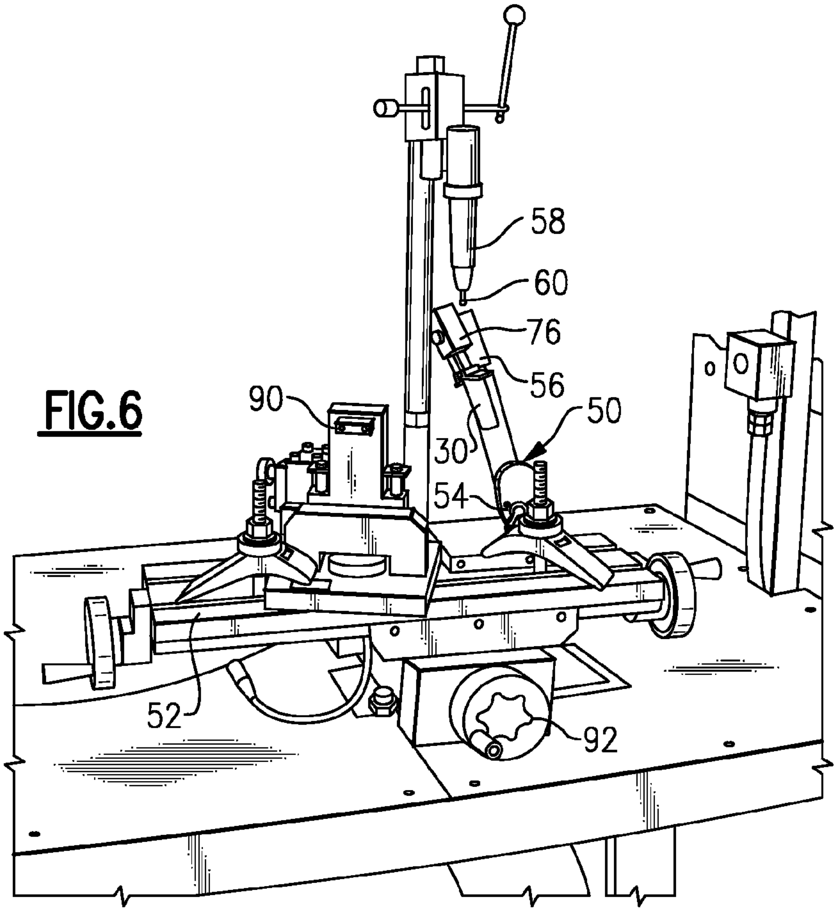
FIG. 6 is a view of a second fixture assembly mounted to a common base with the fixture assembly of FIG. 3.

In another embodiment, as shown in FIG. 6, the base 52 includes a second fixture assembly 90. The second fixture assembly 90 may hold another engine component, which can also be a turbine blade for example. A moving mechanism 92 may be used to move the base 52 in a horizontal direction relative to the linear tool 58. The base 52 may be moved until the second fixture assembly 90 is aligned with the linear tool 58. Once in this position, the linear tool 58 can be moved along the vertical axis 62 to remove cracks as needed.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A fixture assembly for a gas turbine engine component comprising:

a base;

a first pivotable tool mounted to said base;

a second pivotable tool mounted to said first pivotable tool, wherein said first pivotable tool defines a first pivot axis and said second pivotable tool defines a second pivot axis different from said first pivot axis such that said second pivotable tool pivots about said first pivot axis and said fixture pivots about said second pivot axis;

a fixture mounted to said second pivotable tool, said fixture including a holding interface to hold at least one gas turbine engine component during a machining operation; and a linear tool movable along a linear axis to machine a surface on the at least one gas turbine engine component, and wherein said base defines an x-y plane and wherein said linear tool is movable along said linear axis in a z-direction relative to said x-y plane.

2. The fixture assembly according to claim 1 wherein the at least one gas turbine engine component comprises a turbine blade.

3. The fixture assembly according to claim 1 including a moving mechanism for moving said base relative to said linear tool and wherein the base includes a separate holding fixture to support a second gas turbine engine component, and wherein said base is movable relative to said linear tool such that said separate holding fixture positions the second gas turbine engine component such that said linear tool is capable of machining the second gas turbine engine component.

* * * * *